United States Patent [19]

Irwin et al.

[11] Patent Number: 4,500,699

[45] Date of Patent: Feb. 19, 1985

[54] OPTICALLY ANISOTROPIC MELT FORMING COPOLYESTERS

[75] Inventors: Robert S. Irwin, Wilmington; Francis M. Logullo, Sr., Hockessin, both of Del.

[73] Assignee: E. I. Du Pont de Nemours and Company, Wilmington, Del.

[21] Appl. No.: 624,829

[22] Filed: Jun. 26, 1984

[51] Int. Cl.$^3$ ............................................. C08G 63/18
[52] U.S. Cl. .................................... 528/128; 528/125; 528/220
[58] Field of Search ......................... 528/125, 128, 220

[56] References Cited

U.S. PATENT DOCUMENTS

| | | | |
|---|---|---|---|
| 4,118,372 | 10/1978 | Schaefgen | 528/125 |
| 4,137,218 | 1/1979 | Prevorsek et al. | 528/125 |
| 4,226,970 | 10/1980 | Frazer | 528/125 |
| 4,232,143 | 11/1980 | Irwin | 528/125 |
| 4,232,144 | 11/1980 | Irwin | 528/125 |
| 4,245,082 | 1/1981 | Irwin | 528/128 |
| 4,245,084 | 1/1981 | Choe et al. | 528/125 |
| 4,269,965 | 5/1981 | Irwin | 528/128 |
| 4,316,004 | 2/1982 | Imai et al. | 528/125 |
| 4,335,232 | 6/1982 | Irwin | 528/128 |
| 4,381,389 | 4/1983 | Irwin | 528/128 |
| 4,398,015 | 8/1983 | Frazer | 528/125 |
| 4,399,270 | 8/1983 | Frazer | 528/125 |
| 4,447,592 | 5/1984 | Harris, Jr. | 528/128 |

*Primary Examiner*—Lester L. Lee

[57] ABSTRACT

Copolyesters useful for fibers from certain monosubstituted hydroquinones, terephthalic acid and certain substituted benzophenones.

8 Claims, No Drawings

OPTICALLY ANISOTROPIC MELT FORMING COPOLYESTERS

BACKGROUND OF THE INVENTION

1. Field of the Invention

This invention provides novel fiber-forming, melt-spinnable wholly aromatic copolyesters prepared from certain monosubstituted hydroquinones, terephthalic acid and a member of the group consisting of 3,4'-dicarboxybenzophenone, 3,4'-dihydroxybenzophenone and 3-hydroxy-4'-(4-hydroxyphenyl)benzophenone or substituted derivatives thereof. These copolyesters are useful for preparation of filaments having high tenacity and/or high modulus. They are also useful for extrusion molded or injection molded products and for preparation of tough films.

2. Description of the Prior Art

Aromatic copolyesters capable of forming optically anisotropic melts are well known in the art. These polymers have yielded heat-treated fibers with properties that are especially useful in tire cords or drive belts. The provision of novel copolyesters for these purposes is deemed a worthwhile objective.

SUMMARY OF THE INVENTION

The present invention is directed to melt-spinnable copolyesters of fiber-forming molecular weight that exhibit optical anisotropy in the melt and consist essentially of Units I, II and III, said units having the structural formulas:

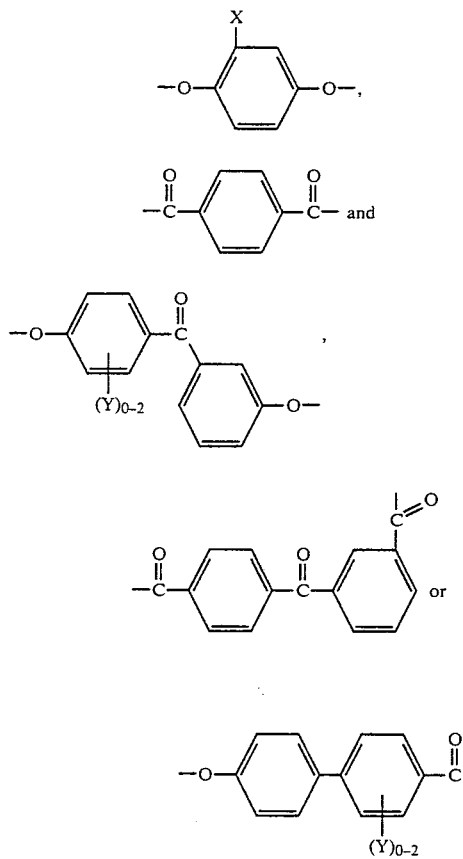

where X is halo, lower alkyl or aryl, and Y is chloro, or methyl with the proviso that Y substituents are not in both 2' and 6' positions: in the proportions of from about 30 to 50 mol % of Unit I, from about 30 to 50 mol % of Unit II and from about 10 to 20 mol % of Unit III. In each case the number of dioxy units in the copolyester is substantially equal to the number of dicarbonyl units. Melt-spun and heat-strengthened filaments of such polyesters as well as films and molded or extruded articles from such polyesters are included in the invention.

DETAILED DESCRIPTION OF THE INVENTION

Unit I in the copolyesters of the invention is lower alkyl-, halo-, or aryl-1,4-dioxyphenylene. Methyl, chloro and phenyl groups exemplify the preferred lower alkyl, halo and aryl groups, respectively. Unit II is the terephthaloyl radical. Unit III is 3,4'-dicarbonylbenzophenone, 3,4'-dioxybenzophenone, or 3-oxy-4'-(4-hydroxyphenylbenzophenone) and selected substituted derivatives thereof, but is preferably unsubstituted.

The number of dioxy units present in the copolyester is substantially equal to the number of dicarbonyl units. Mole % is calculated on the basis of total moles of units present, i.e. [I+II+III].

Suitable precursors for Unit I include the corresponding substituted hydroquinone, generally employed in the form of the diacetate. Terephthalic acid is a suitable precursor for Unit II. Suitable diol precursors for Unit III are ordinarily employed in the form of diacetates.

The precursor reactants are generally combined in proportions corresponding to the molar proportions of the units desired in the copolyester products except that it is preferred to use a molar excess, indicated in the examples as (%) of the more volatile diacetate of the substituted hydroquinone.

Conventional polymerization techniques may be employed such as described in U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium to approximately 310°–380° C. Polymerization is continued for up to a total of 0.5 to one hour or longer if necessary until a polymer of fiber-forming molecular weight is obtained. Usually a vacuum is applied to obtain a final product with high molecular weight. The copolyesters of the invention exhibit optical anisotropy in the melt as described in U.S. Pat. No. 4,118,372.

FILAMENT PREPARATION

The copolyesters of the invention are spun into filaments by conventional melt-spinning at temperatures below decomposition temperatures usually less than 360° C. In the examples below, filaments were prepared by melt-spinning into a quenching atmosphere and collected at a windup speed specified in the example. Melt pumping speed is adjusted to give the approximate linear density (tex) shown in the tables at the stated windup rate.

As used herein, the term "as-spun fiber" refers to a fiber which has not been drawn or heat treated after extrusion and normal windup.

HEAT TREATMENT AND UTILITY

Following collection, samples of undrawn (as-spun) monofilament are heat-treated in essentially relaxed condition in an oven as taught in Luise U.S. Pat. No. 4,183,895. Heating is in a nitrogen atmosphere. The temperature is typically increased in stages from room temperature to a final temperature, which is usually that needed for the optimum development of high tenacity and break elongation.

Molecular weight growth during heat treatment can increase the flow temperature of the filaments (see U.S. Pat. No. 4,118,372), making possible heat treatment temperatures in excess of the original polymer flow temperature. The maximum heat-treatment temperature should be close to or above the initial flow temperature. Higher molecular weights favorably affect the development of high tenacity and break elongation. Higher spin stretch factor also favors the development of high tenacity, break elongation and modulus.

The heat treated fibers of this invention are useful for a variety of applications such as in ropes or in nonwoven sheets, and in reinforcement of plastic composites.

TEST METHODS

Inherent viscosity ($n_{inh}$), a measure of molecular weight, is computed from $n_{inh} = (\ln n_{rel})/C$ where $n_{rel}$ is the relative viscosity and C is solution concentration in grams of polymer per deciliter of solvent. Relative viscosity is the ratio of polymer solution flow time to solvent flow time in a capillary viscometer at 30° C. The solvent employed was a special mixture coded TM4PP consisting of 7.5% trifluoroacetic acid, 12.5% perchloroethylene, 17.5% methylene chloride, 50% 4-chlorophenol, and 12.5% dichlorotetrafluoroacetone hydrate. The concentration was 0.5 g polymer per deciliter of solvent.

Monofilament tensile properties were measured in accordance with A.S.T.M. 2101 Part 33 (1980) using a recording stress-strain analyzer at 70° F. (21.1° C.) and 65% relative humidity. Gauge length was 1.0 in (2.54 cm), and rate of elongation 10%/min. Results are reported as T/E/Mi where T is break tenacity in dN/tex, E is elongation-at-break expressed as the percentage by which initial length increased, and Mi is initial tensile modulus in dN/tex. Linear density is reported in tex units. Average tensile properties for five filament samples are reported.

EXAMPLES

The same general procedure was used in all the examples. It should be understood that the best values reported below are believed to be representative of what can be obtained. The data presented do not constitute all the runs performed involving the indicated reactants. Unfamiliarity with the reaction requirements of the system, use of impure reactants or inappropriate heat treatment conditions may have caused the variation in results such as lower tenacity, elongation or modulus to be obtained.

The monomer ingredients are added in substantially the same molar ratios as desired in the final polymer except that an excess (usually 4 to 7%) of acetylated dihydric phenol is generally used. The resultant polymer is identified, for example, as CHQ/DHB/TA (35/15/50) meaning it contains 35 mole % of chloro-1,4-dioxyphenylene units (from the diacetate of chlorohydroquinone), 15 mole % of 3,4'-dioxybenzophenone units (from 3,4'-dihydroxybenzophenone), and 50 mole % of terephthaloyl units (from terephthalic acid). Excesses of acetates are not included in these percentages.

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLE 1

Polyester from Chlorohydroquinone (CHQ) Diacetate, 3,4'-Dihydroxybenzophenone (DHB) Diacetate, and Terephthalic Acid (TA)

A polymer with a composition CHQ/DHB/TA (35/15/50) was prepared by mixing the following in the polymerization vessel:

16.79 g CHQ diacetate (0.0735 mole including 5 mole % excess)

9.39 g DHB diacetate (0.0315 mole including 5 mole % excess)

16.60 g TA (0.100 mole)

The mixture was heated in the polymerization vessel from 200° C. to 340° C. in 45 minutes at atmospheric pressure under nitrogen purge, then held at 340° C. for 25 minutes under vacuum while reducing the pressure from atmospheric to 20 mm and an additional 30 minutes while slowly reducing the pressure to 1 mm. Inherent viscosity in TM4PP was 1.29. The polymer had a flow temperature of 276° C. and was melt anisotropic (TOT test).

The polymer was melt spun through a single-hole spinneret with 0.23 mm hole diameter at 315° C. and windup speed of 99 mpm. The monofilament was heat treated in a nitrogen-purged atmosphere in an essentially relaxed condition starting at a temperature approximately room temperature and increasing over 7 hr. to 304° C. and then holding for 7 hr. at 304° C. The following tensile properties were obtained for the as-spun and heat treated fibers:

| | Max. Temp. | Tex | T | E | Mi |
| --- | --- | --- | --- | --- | --- |
| As-spun | — | 1.8 | 5.0 | 1.2 | 429 |
| Heat-Treated | 304° C. | 1.3 | 24.5 | 3.7 | 682 |
| (Best break) | | | (30.9 | 4.1 | 858) |

EXAMPLE 2

Polyester from Chlorohydroquinone Diacetate 3,4'-Dihydroxy-3'-Methyl Benzophenone Diacetate (DHMD), and Terephthalic Acid A polymer with a composition CHQ/DHMB/TA (37.5/12.5/50) was prepared by mixing the following in the polymerization vessel:

8.83 g CHQ diacetate (0.0386 mole including 3 mole % excess)

4.02 g DHDPE diacetate (0.0129 mole including 3 mole % excess)

8.30 g TA (0.05 mole).

The temperature was raised from 286° C. to 330° C. in 37 min. at atmosphere pressure under nitrogen, then was raised from 330° C. to 332° C. in 19 min. under vacuum while reducing the pressure from atmospheric to high vacuum ($\leq 1$ mm). Fibers could be pulled from the thermal gradient hot bar at 302° C. Inherent viscosity in TM4PP was 0.89.

The polymer which formed an optically anisotropic melt was melt spun through a single-hole spinnerat with 0.23 mm hole diameter at a spinning temperature of 310° C. and a windup speed of 549 mpm. The filament was heat-treated in a nitrogen purge as in Example 1. Tensile properties were as follows:

|  | Max. Temp. | Tex | T | E | Mi |
|---|---|---|---|---|---|
| As-spun | — | 0.61 | 2.2 | 0.6 | 316 |
| Heat-Treated | 304° C. | 0.57 | 14.4 | 3.5 | 430 |
| (Best break) |  |  | (16.5 | 3.9 | 457) |

EXAMPLE 3

Polyester from Chlorohydroquinone Diacetate, 3-Hydroxy-4'-(4-Hydroxyphenyl-)Benzophenone (HHPB) Diacetate, and Terephthalic Acid A polymer having a composition CHQ/HHPB/TA (35/15/50) was prepared by mixing the following in the polymerization vessel:

16.63 g CHQ diacetate (0.0728 mole including 4 mole % excess)

11.56 g HHPB diacetate (0.0309 mole including 3 mole % excess)

16.60 g TA (0.100 mole)

The temperature was raised from 220° C. to 345° C. in 70 minutes at atmospheric pressure under nitrogen, then was held at 345°–340° C. for 10 minutes while slowly reducing the pressure to 20 mm. The pressure was further reduced from 20 mm to 1 mm during an additional 25 minutes at 340° C. The resulting polymer had an inherent viscosity in TM4PP of 1.65. The polymer flow temperature was 282° C. and the melt was anisotropic (TOT).

The polymer was melt spun through a single-hole spinneret with 0.23 mm hole diameter at a spinning temperature of 310° C. and a windup speed of 457 mpm. The filament was heat-treated in a nitrogen purge as in Example 1. Tensile properties were as follows:

|  | Max. Temp. | Tex | T | E | Mi |
|---|---|---|---|---|---|
| As-Spun | — | 0.53 | 5.2 | 1.9 | 375 |
| Heat-Treated | 304° C. | 0.63 | 18.6 | 5.6 | 340 |
| (Best break) |  |  | (21.4 | 5.8 | 376) |

EXAMPLE 4

Polyester from Chlorohydroquinone Diacetate, Terephthalic Acid and 3,4'-Dicarboxybenzophenone (DCB)

A polymer with a composition CHQ/TA/DCB (50/35/15) was prepared by mixing the following in the polymerization vessel:

39.24 g CHQ diacetate (0.1716 mole including 5 mole % excess)

19.01 g TA (0.1144 mole)

11.58 g DCB (0.0490 mole)

The temperature was raised from 150° C. to 350° C. in 150 minutes at atmospheric pressure under nitrogen, then was held at 350° C. for 30 minutes under vacuum while reducing the pressure from atmospheric to high vacuum ($\leq 1$ mm). The resulting polymer on the thermal gradient hot bar softened at 344° C. and at 385° C. fibers could be pulled from the bar. The polymer was insoluble in TM4PP.

The polymer which formed an optically anisotropic melt was melt spun through a 5-hole spinneret with 0.23 mm diameter holes at a spinning temperature of 370° C. and a windup speed of 73 mpm. The filaments were heat-treated in a nitrogen purge as in Example 1. Tensile properties were as follows:

|  | Max. Temp. | Tex | T | E | Mi |
|---|---|---|---|---|---|
| As-Spun | — | 10.3 | 4.8 | 2.0 | 184 |
| Heat-Treated | 304° C. | 20.6 | 10.2 | 3.8 | 298 |
| (Best break) |  |  | (10.6 | 4.0 | 307) |

EXAMPLE 5

Polyester from Chlorohydroquinone Diacetate, Terephthalic Acid and 3,4'-Dicarboxy Benzophenone A polymer with a composition CHQ/TA/DCB (50/32.5/17.5) was prepared by mixing the following in the polymerization vessel:

43.25 g CHQ diacetate (0.1892 mole including 7 mole % excess)

19.09 g TA (0.1149 mole)

16.72 g DCB (0.0619 mole)

The temperature was raised from 150° C. to 325° C. in 255 minutes at atmospheric pressure under nitrogen, then was held at 325° C. for 15 minutes while reducing the pressure from atmospheric to high vacuum ($\leq 1$ mm). The resulting polymer on the thermal gradient hot bar softened at 306° C. and at 340° C. fibers could be pulled from the bar. Inherent viscosity in TM4PP was 0.90.

The polymer which formed an optically anisotropic melt was melt spun through a 5-hole spinneret with 0.23 mm diameter holes at spinning temperatures of 310°–318° C. and a windup speed of 329 mpm. The filaments were heat-treated in a nitrogen purge as in Example 1. Tensile properties were as follows:

|  | Max. Temp. | Tex | T | E | Mi |
|---|---|---|---|---|---|
| As-spun | — | 0.64 | 3.08 | 0.8 | 409 |
| Heat-Treated | 304° C. | 0.66 | 13.6 | 3.0 | 440 |
| (Best break) |  |  | (15.4 | 3.5 | 431) |

EXAMPLE 6

Polyester from Chlorohydroquinone Diacetate, Terephthalic Acid and 3,4′-Dicarboxybenzophenone A polymer with a composition CHQ/TA/DCB (50/30/20) was prepared by mixing the following in the polymerization vessel:

18.97 g CHQ diacetate (0.0830 mole including 5 mole % excess)
7.88 g TA (0.0474 mole)
8.54 g DCB (0.0316 mole)

The temperature was raised from 150° C. to 325° C. in 150 minutes at atmospheric pressure under nitrogen, then was held at 325° C. for 17 minutes under vacuum while reducing the pressure from atmospheric to 0.4 mm. The resulting polymer on the thermal gradient hot bar softened at 296° C. and at 327° C. fibers could be pulled from the bar. Inherent viscosity in TM4PP was 1.28.

The polymer which formed an optically anistropic melt was melt spun through a single-hole spinneret with 0.23 hole diameter at a spinning temperature of 331°–343° C. and a windup speed of 82–110 mpm. The filament was heat-treated in a nitrogen purge. Tensile properties were as follows:

|  | Max. Temp. | Tex | T | E | Mi |
| --- | --- | --- | --- | --- | --- |
| As-spun | — | 2.6 | 3.9 | 1.4 | 299 |
| Heat-Treated | 275° C. | 3.8 | 10.3 | 3.0 | 401 |
| (Best break) |  |  | (11.7 | 3.6 | 440) |

EXAMPLE 7

Polyester from Methylhydroquinone (MHQ) Diacetate, Terephthalic Acid, and 3,4′-Dicarboxybenzophenone A polymer with a composition MHQ/TA/DCB (50/40/10) was prepared by mixing the following in the polymerization vessel:

27.82 g MHQ diacetate (0.1336 mole including 5 mole % excess)
16.91 g TA (0.1018 mole)
6.88 g DCB (0.0254 mole)

The temperature was raised from 150° C. to 300° C. in 135 minutes at atmospheric pressure under nitrogen, then was raised from 300° to 325° C. in 30 minutes under vacuum while reducing the pressure from atmospheric to high vacuum (≦1 mm). The resulting polymer on the thermal gradient hot bar softened at 296° C. and at 328° C. fibers could be pulled from the bar. Inherent viscosity in TM4PP was 1.42.

The polymer which formed an optically anisotropic melt was melt spun through a 5-hole spinneret with 0.23 mm diameter holes at a spinning temperature of 346°–353° C. and a windup speed of 119–183 mpm. The filaments were heat-treated in a nitrogen purge as in Example 1. Tensile properties were as follows:

|  | Max. Temp. | Tex | T | E | Mi |
| --- | --- | --- | --- | --- | --- |
| As-spun | — | 1.4 | 4.4 | 1.4 | 359 |
| Heat-Treated | 304° C. | 2.0 | 9.6 | 3.2 | 292 |
| (Best break) |  |  | (13.2 | 3.5 | 326) |

We claim:

1. A copolyester consisting essentially of Units I, II and III, said units having the structural formulas:

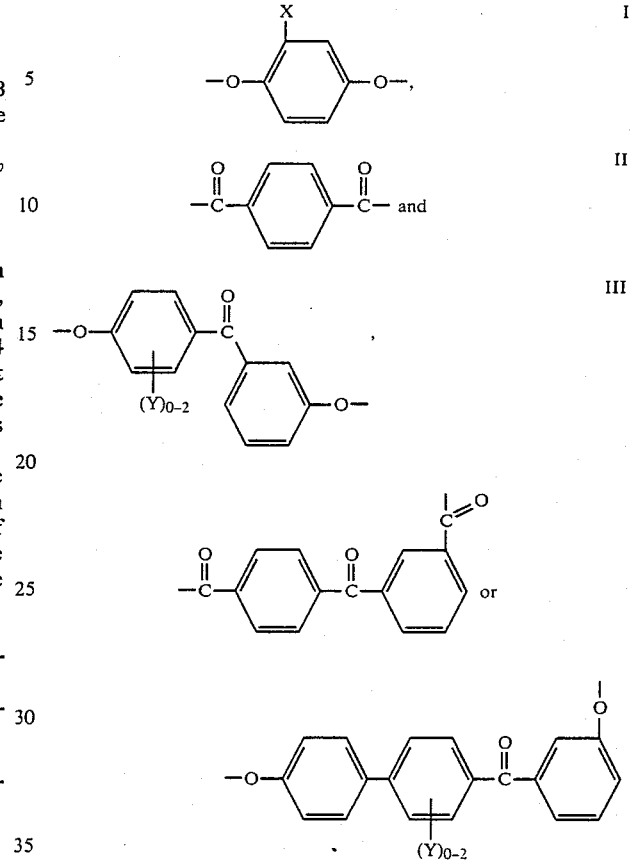

where X is chloro, bromo, methyl, ethyl or phenyl, and Y is chloro or methyl with the proviso that Y substituents are not in both 2′ and 6′ positions; in the proportions of from about 30 to 50 mol % of Unit I, from about 30 to 50 mol % of Unit II and from about 10 to 20 mol % of Unit III.

2. A copolyester according to claim 1 where X is chloro.

3. A copolyester according to claim 1 wherein Unit III is

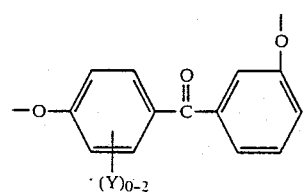

4. A copolyester according to claim 1 wherein Unit III is

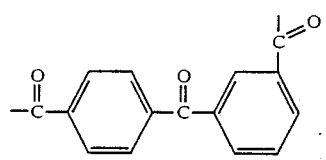

5. A copolyester according to claim 1 wherein Unit III is
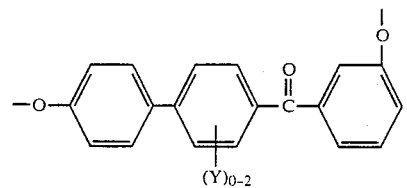
6. A fiber of the copolyester of claim 1.
7. A film of the copolyester of claim 1.
8. A molded or extruded article of the copolyester of claim 1.
* * * * *